Patented Mar. 9, 1937

2,073,310

UNITED STATES PATENT OFFICE

2,073,310

WATERPROOFING COMPOSITION

Carl J. Malm and Charles R. Fordyce, Rochester, N. Y., assignors, by mesne assignments, to Eastman Kodak Company, Jersey City, N. J., a corporation of New Jersey No Drawing. Application December 12, 1932, Serial No. 646,869

9 Claims.  (Cl. 134—79)

This invention relates to moistureproofing and waterproofing compositions and more particularly to a composition containing as one of its essential ingredients a mixed cellulose organic ester.

The invention has as its principal object to provide a composition which may be applied as a coating for rendering various types of surfaces substantially impervious to water and other liquids and especially to protect them against the penetration of moisture. A further object is to provide a composition which may be employed as a protective coating for various types of flexible materials such as cellulosic sheeting, paper, cardboard and the like. Another important object is to provide a composition of matter especially adapted for the manufacture of clear, transparent, moisture-resistant films, sheets, and the like. A still further object is to provide a composition which may be readily cast or coated on an appropriate surface to produce clear, transparent, moisture-resistant sheets or films of the higher cellulose organic esters without the use of wax. Other objects will hereinafter appear.

The above objects are accomplished by our invention which comprises the formulation of coating compositions in accordance with the following description. After conducting numerous experiments with many different materials, we have determined that a particularly valuable waterproofing composition is obtained by dissolving a mixture of one of the mixed cellulose organic esters, an ester formed by the interaction of a polyhydric alcohol and a higher aliphatic acid, with or without an ester gum or a resin, in an appropriate common organic solvent.

In the following examples we have included several of the preferred embodiments of our invention, but they are presented merely for the purpose of illustration and not as a limitation thereof.

Example I

A typical example of a highly satisfactory waterproofing composition contains the following ingredients in the indicated proportions by weight:

| | Parts |
|---|---|
| Cellulose acetate stearate (containing approximately 38% stearyl) | 100 |
| Glycerol tristearate | 3 |
| Ester gum | 10 |
| Normal butyl acetate | 400 |

The cellulose acetate stearate, glycerol tristearate and ester gum are dissolved in the normal butyl acetate to make up a clear homogeneous solution. Various optional ingredients may be added to the above formula as desired. For example, various dyestuffs, pigments, and other coloring matter may be included when it is desired to produce a waterproof composition which will also serve for decorative purposes.

In the following examples are included other formulae which we have found satisfactory as coating compositions, or as compositions for use in the casting of sheets or films.

Example II

| | Parts by weight |
|---|---|
| Cellulose acetate stearate (containing about 30% stearyl) | 100 |
| Ethylene glycol dipalmitate | 2 |
| Ester gum | 10 |
| Toluene (solvent) | 300 |
| Ethyl acetate (solvent) | 100 |

Example III

| | Parts by weight |
|---|---|
| Cellulose acetate stearate (containing approximately 50% stearyl) | 100 |
| Ethylene glycol distearate | 3 |
| Ester gum | 10 |
| Toluene | 350 |
| Ethyl lactate | 50 |

Example IV

| | Parts by weight |
|---|---|
| Cellulose acetate stearate (containing about 38% stearyl) | 100 |
| Glycerol tristearate | 3 |
| Glyptal resin | 10 |
| Normal butyl acetate | 400 |

Example V

| | Parts by weight |
|---|---|
| Cellulose acetate stearate (containing about 38% stearyl) | 100 |
| Glycerol tristearate | 3 |
| Vinyl acetate | 10 |
| Normal butyl acetate | 400 |

Example VI

| | Parts by weight |
|---|---|
| Cellulose acetate stearate (containing about 30% stearyl) | 100 |
| Glycerol tristearate | 2 |
| Butyl acetate | 400 |

*Example VII*

| | Parts by weight |
|---|---|
| Cellulose acetate stearate | 100 |
| Ethylene glycol distearate | 2 |
| Toluene | 300 |
| Ethyl acetate | 100 |

The above compositions are distinguished by the fact that they contain a mixed cellulose organic ester as the base material. We have found that these esters are particularly valuable when used in a moistureproofing composition, especially when used in connection with waterproofing ingredients of the type of the esters of polyhydric alcohols and the higher aliphatic acids, such as palmitic, stearic and the like. While we are not limited to the use of a mixed cellulose organic ester of any particular higher acyl content, we prefer to use a compound containing a relatively substantial amount of the higher acyl group. For example, in the case of cellulose acetate stearate, we prefer to use an ester containing between 30% and 40% stearyl. Other suitable cellulose organic esters include those containing 25% or more of acyl groups of acids of more than 12 carbon atoms, such as myristic and lauric acids. It is to be noted that the mixed cellulose organic esters just referred to may be prepared in accordance with the disclosure of the U. S. patent to Clarke and Malm No. 1,800,860.

The above compositions are additionally characterized by the fact that an ester of a polyhydric alcohol and one of the higher aliphatic acids containing at least 16 carbon atoms is employed as the principal waterproofing ingredient. While waxes and substances of like character have been found satisfactory for use in certain waterproofing and moistureproofing compositions, we have found the use of the higher esters of the polyhydric alcohols, particularly effective and, so far as we are aware, we are the first to propose the use of these compounds in waterproofing compositions in connection with the mixed cellulose organic esters as the base material.

While we have disclosed ester gum or resins as ingredients of our coating composition, these ingredients are not absolutely essential constituents. Furthermore, other natural and synthetic gums and resins may be employed. We may use, for example, certain of the glyptal resins or the vinyl resins such as polymerized vinyl acetate and others.

It will be evident also to those skilled in the art that a variety of solvents may be employed in the formulation of the above compositions, the only requisite being that they are common solvents for the mixed cellulose organic esters and the various other ingredients of the composition and that they possess the correct degree of volatility and other essential characteristics. In some cases, it may be desirable to use benzene or xylene in place of toluene in the above formulae, the required adjustment being made in the amount of ethyl acetate or other cellulose ester solvent. The choice of the solvent will, of course, depend largely upon the particular mixed cellulose organic ester employed in the composition, as well as the nature of the other ingredients, and we do not limit ourselves to any particular solvent or solvent combination.

The compositions of our invention are particularly well adapted for use as coating compositions, especially where it is desired to protect a surface against the action of water, water vapor, and other liquids and vapors. It may be effectively applied as an impregnating solution for rendering cellulose acetate and other cellulose organic ester sheeting, paper, cardboard and various other types of cellulosic material impermeable to water and certain other liquids. It is also especially valuable as a dope or casting solution for use in the manufacture of films, sheets, and the like. For example, one of the above described compositions may be coated out upon a suitable surface, such as the coating roll of mechanism shown in the U. S. patent to Sulzer No. 1,466,733, the solvents evaporated therefrom, and the material thereafter stripped off in the form of a sheet or film. It is an important feature of our invention that it is unnecessary to use wax to obtain the desired degree of moisture-resistance. This is especially advantageous since it enables us to use the high cellulose organic esters which with wax ordinarily give poor quality sheets or films when coated .001 inch or more in thickness. By employing the polyhydric alcohol esters of higher fatty acids, we are enabled to use higher concentrations of these valuable water proofing agents without blushing than would be the case with wax which has a tendency to cause blushing in the production of these products, especially with the higher cellulose organic esters. The peculiar waterproof quality of the material produced according to our invention renders it especially valuable as a waterproof wrapping material and also for use in the form of protective sheeting for various purposes.

What we claim as our invention and desire to be secured by Letters Patent of the United States is:

1. A coating composition adapted for the manufacture of a highly moisture-resistant, non-blushing sheet or film having approximately the following composition:

| | Parts by weight |
|---|---|
| Cellulose acetate stearate (containing about 38% stearyl) | 100 |
| Glycerol tristearate | 3 |
| Ester gum | 10 |
| Normal butyl acetate | 400 |

2. A coating composition adapted for the manufacture of a highly moisture-resistant, non-blushing sheet or film, the film-forming constituents of which consist essentially of a mixed cellulose organic ester containing an acyl group of a lower aliphatic acid and an acyl group of an aliphatic acid of not less than 10 carbon atoms, and an ester of a polyhydric alcohol and an aliphatic acid of not less than 16 carbon atoms, dissolved in a common organic solvent, the polyhydric alcohol ester being present in an amount sufficient to render the film formed from the composition highly moisture-resistant.

3. A coating composition adapted for the manufacture of a highly moisture-resistant, non-blushing sheet or film, the film-forming constituents of which consist essentially of cellulose acetate stearate and an ester of a polyhydric alcohol and an acid of not less than 16 carbon atoms, dissolved in a common organic solvent, the polyhydric alcohol ester being present in an amount corresponding to 2 to 3 percent by weight of the cellulose acetate stearate.

4. A coating composition adapted for the manufacture of a highly moisture-resistant, non-blushing sheet or film, the film-forming constituents of which consist essentially of cellulose acetate stearate, about 2 to 3 percent, based on the weight of the cellulose acetate stearate, of an ester of a polyhydric alcohol and an acid of not less than 16 carbon atoms, and about 10 percent of a gum, dissolved in a common organic solvent.

5. A coating composition adapted for the manufacture of a highly moisture-resistant, non-blushing sheet or film, the film-forming constituents of which consist essentially of cellulose acetate stearate containing from 25 to 50 percent stearyl, 2 to 3 percent, based on the weight of the cellulose acetate stearate, of glycerol tristearate, and about 10 percent ester gum, dissolved in a common organic solvent.

6. A clear, transparent, flexible, highly moisture-resistant sheet or film consisting essentially of a mixture of a mixed cellulose organic ester containing an acyl group of a lower aliphatic acid and an acyl group of an aliphatic acid of not less than 12 carbon atoms, and an ester of a polyhydric alcohol and an aliphatic acid of not less than 16 carbon atoms, the polyhydric alcohol ester being present in an amount sufficient to render the sheet or film highly moisture-resistant.

7. A clear, transparent, flexible, highly moisture-resistant sheet or film consisting essentially of cellulose acetate stearate and 2 to 3 percent, based on the weight of the cellulose acetate stearate, of an ester of a polyhydric alcohol and an acid of not less than 16 carbon atoms.

8. A clear, transparent, flexible, highly moisture-resistant sheet or film consisting essentially of cellulose acetate stearate, 2 to 3 percent, based on the weight of the cellulose acetate stearate, of an ester of a polyhydric alcohol and an acid of not less than 16 carbon atoms, and about 10 percent ester gum.

9. A clear, transparent, flexible, highly moisture-resistant sheet or film consisting essentially of cellulose acetate stearate containing from 25 to 50 percent stearyl, 2 to 3 percent, based on the weight of the cellulose acetate stearate, of glycerol tristearate and about 10 percent ester gum.

CARL J. MALM.
CHARLES R. FORDYCE.